Feb. 14, 1961  R. SCHÖN  2,971,584

DEVICES FOR STABILISING HELICOPTER AIRCRAFT

Filed Feb. 25, 1957

INVENTOR

RICHARD SCHÖN

BY Richard Schön

# United States Patent Office 2,971,584
Patented Feb. 14, 1961

2,971,584

DEVICES FOR STABILISING HELICOPTER AIRCRAFT

Richard Schön, Prague, Czechoslovakia, assignor to Výzkumný a zkušební letecký ústav, Letnany, near Prague, Czechoslovakia Filed Feb. 25, 1957, Ser. No. 642,192

4 Claims. (Cl. 170—160.16)

The present invention relates to devices for stabilizing helicopter aircraft during flight and for preventing the loss of rotational speed of the lifting rotor, and the consequent loss of lifting force, in the event of engine failure.

During straight flight the helicopter undergoes repeated changes in its attitude around its lateral axis. This continuous rocking movement is undesirable, and modern helicopters are therefore provided with stabilizers in the cyclic control of the lifting rotor. However, the presently known stabilizers do not relieve the pilot of the helicopter of the necessity of concentrating upon the control during flight. In case of engine failure and the stopping of the engine, the pilot must, within two or three seconds, decrease the pitch of the rotor blades by the collective control to the degree necessary for ensuring auto-rotation of the lifting rotor so that a safe emergency landing may be made in this way. If the pilot fails to perform this operation, there is the danger that the rotation speed of the lifting rotor will decrease below a safe value and flapping up of the rotor blades will result.

The stabilization of the rotor control is, at the present time, achieved for smaller helicopters either by the gyroscopic moment of flyweights or, aerodynamically, by auxiliary control surfaces. Automatic pilots are used for stabilizing larger helicopters. The combined stabilizing of normal powered flight and the regulation of the rotational speed of the rotor for automatic change-over to autorotative flight in the event of engine failure has not yet been realised. The regulation of the pitch of the rotor blades alone is sometimes provided for rotor blades suspended on lag hinges. In that case, it is intended that the blades will swing out due to inertia in the direction of rotation due to a decrease in rotational speed, whereby the pitch control linkage will adjust the blades to a lower pitch. However, this arrangement is not quite satisfactory in practice, as the free wheel and the inertia of the tail or directional control propeller, which is suitably coupled with the lifting rotor, tend to drive the rotor hub, so that the main or lifting rotor blades cannot override the hub and thus change their own pitch. Even if the described arrangement is effective to decrease the pitch of the lifting rotor blades in the event of engine failure, such arrangement is not sufficiently sensitive to a decrease in rotational speed so that the decreased pitch only occurs after a substantial reduction in rotor speed, at which speed the lifting force is inadequate for a safe emergency landing.

It is an object of the present invention to maintain steady or stabilized flight of the helicopter and to prevent an accident in case of engine failure by a combined device in which the gyroscopic moment of flyweights is utilized for stabilizing normal powered flight and is conveniently coupled with the cylic and collective pitch control in order to automatically decrease the pitch or angle of attack of the rotor blades for ensuring autorotation upon engine failure and a consequent predetermined decrease in rotor speed.

The above, and other objects, features and advantages of the invention, will be apparent in the following detailed description of an illustrative embodiment which is to be read in connection with the accompanying drawing, forming a part hereof, and wherein.

Figure 1:
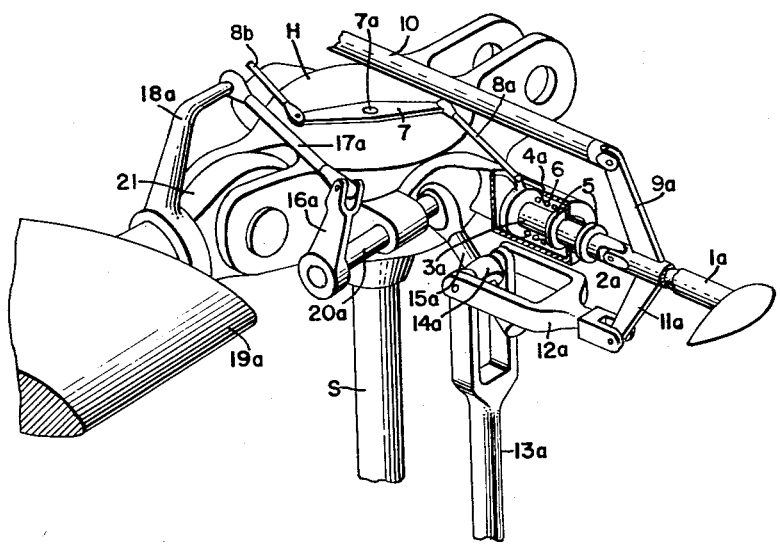
Fig. 1 is a perspective view of a stabilizing device embodying the invention and capable of effecting the automatic changeover to autorotation in the event of engine failure.

Referring to the drawing in detail, it will be seen that the stabilizing device embodying the invention is associated with a two-bladed main or lifting rotor of a helicopter having rotor blades 19a and 19b which extend in diametrically opposed directions. The stabilizing device includes elongated arms 1a and 1b associated with the rotor blades 19a and 19b and disposed in a plane which passes through the axis of rotation of the rotor head H and rotor shaft S at right angles to the plane passing through the axis of rotation and containing the longitudinal axes of the rotor blades 19a and 19b.

Each of the arms 1a and 1b has a suitable weight at its outer end, while the inner ends of the arms 1a and 1b are pivotally connected, as at 2a and 2b, to bars or plungers 3a and 3b which are axially slidable in sleeves 4a and 4b, respectively, fixed on the rotor head H, with the axes of the sleeves 4a and 4b extending radially with respect to the axis of rotation of the rotor head. The pivots 2a and 2b lie in the plane of rotation of the outer ends of the plungers 3a and 3b with the rotor head so that the arms 1a and 1b are free to swing upwardly and downwardly in the plane containing the longitudinal axes of the arms 1a and 1b and passing through the axis of rotation of the rotor head and rotor shaft.

Each of the plungers 3a and 3b is provided with axially spaced apart collars 5 fixed thereon within the related sleeve 4a or 4b and outside the related sleeve, respectively, in order to limit the axial movement of the plunger 3a or 3b with respect to the sleeve 4a or 4b, respectively. The inner end of each of the plungers or bars 3a and 3b is provided with a circular flange, and a helical compression spring 6 is interposed axially between such flange and the outer end wall of the related sleeve 4a or 4b in order to yieldably urge the related plunger 3a or 3b axially in the radially inward direction with respect to the related sleeve.

The flange at the inner end of each of the plungers 3a and 3b is provided with a radial projection extending slidably through a suitable slot in the related sleeve 4a or 4b, and such projections are pivotally connected to one end of links 8a and 8b which, at their other ends, are pivotally connected to the opposite ends of a lever 7. The lever 7 is pivoted, at its center, as at 7a, to swing about the axis of rotation of the rotor head, and the links 8a and 8b are equally dimensioned so that, at any time, the plungers 3a and 3b will occupy the same positions in relation to the sleeves 4a and 4b, respectively, to dispose the pivots 2a and 2b at the same radial distance from the axis of rotation of the rotor, even in the event of the failure of one of the springs 6.

The arms 1a and 1b are provided with upwardly and downwardly extending arms 9a and 11a, and 9b and 11b, respectively, which extend from the inner end portions of the arms 1a and 1b and are disposed in the plane in which the arms 1a and 1b are swingable about the pivots 2a and 2b. The upper or free ends of the lever arms 9a and 9b are pivotally connected to the opposite ends of a tie rod 10 so that any swinging of the arms 1a and 1b about the pivots 2a and 2b, respectively, will be equal in angular extent or magnitude and in the same angular direction, while the described connection between the arms 1a and 1b will permit the transmission of kinetic energy therebetween.

The lever arms 11a and 11b are pivotally connected, at their lower free ends, to the radially outer ends of fork rods 12a and 12b, respectively, while the inner ends of the fork rods 12a and 12b, and the upper forked ends of control bars 13a and 13b, respectively, are pivotally connected to pivot members 14a and 14b. The control bars 13a and 13b are actuated by a swash plate (not shown) or by any other known device for adjusting the angle of attack of the rotor blades.

The pivot members 14a and 14b are formed with bores extending therethrough diametrically with respect to the pivoting axis of the related pivot member and slidably receiving bars 15a and 15b which extend radially from rockable shafts 20a and 20b, respectively, mounted in suitable bearings carried by the rotor head. Lever arms 16a and 16b also extend radially from the rock shafts 20a and 20b and, at their free ends, are pivotally connected to tie rods 17a and 17b which are, in turn, pivotally connected to control rods 18a and 18b which are secured to the rotor blades 19a and 19b, respectively, and extend radially upward with respect to the longitudinal axes of the rotor blades.

As is usual in helicopters, each of the rotor blades 19a and 19b is connected, at its inner end, to a fitting 21 which is pivotally mounted on the rotor head H for swinging about an axis lying in the plane of rotation of the rotor head, while the rotor blade is rockable about its longitudinal axis relative to the fitting 21 in response to angular displacement of the related control rod 18a or 18b in order to vary the pitch or angle of attack of the rotor blade.

When the main or lifting rotor is at rest, the compression springs 6 urge the related plungers 3a and 3b to their innermost positions within the sleeves 4a and 4b, respectively, so that the pivots 2a and 2b of the arms 1a and 1b are disposed at the smallest possible radial distance from the axis of rotation of the rotor head. Since the rigid tie rod 10 prevents movement toward each other of the upper ends of the lever arms 9a and 9b, the inward movement of the plungers 3a and 3b is accompanied by the swinging of the lever arms 9a and 9b about their pivotal connections with the tie rod 10 so that the lower ends of the lever arms 11a and 11b, as well as the fork rods 12a and 12b, move radially inward toward the axis of rotation of the rotor. Since the pivot members 14a and 14b are pivotally connected to the inner ends of the fork rods 12a and 12b, the movement of the plungers 3a and 3b to their innermost positions, as described above, results in corresponding movement of the pivot members 14a and 14b to their corresponding innermost positions. Further, since the lower ends of the control bars 13a and 13b are held against downward movement by the swash plate or other device (not shown) by which the control bars are actuated, such control bars 13a and 13b will rock about their lower ends as the pivot members 14a move inwardly, as described above, along arcuate paths having the lower ends of the control bars 13a and 13b as their respective centers. During the inward movement of the pivot members 14a and 14b, the latter slide along the related rods 15a and 15b and effect downward angular displacement of the latter. Thus, when the pivot members 14a and 14b are displaced to their innermost positions, the rods 15a and 15b are angularly moved to their corresponding lowermost positions and, by reason of the coupling of the rods 15a and 15b to the rotor blades 19a and 19b, by means of the rock shafts 20a and 20b, the arms 16a and 16b, the links or tie rods 17a and 17b and the control levers 18a and 18b, the rotor blades 19a and 19b are turned about their longitudinal axes in the direction for assuming a minimum angle of attack.

When the rotor and the stablizing device described above start to rotate, the rotor blades are raised or swing upwardly about the pivoting axis of the fittings 21 due to centrifugal force first and then due to the lift and are changing their coning angle. During such upward movement of the blades, the upper ends of their control levers 18a and 18b also move upwardly, while the lever arms 16a and 16b remain stationary, so that the control levers 18a and 18b are further turned by the rods 17a and 17b around the longitudinal axes of the blades for further decreasing the angle of attack. Consequently when the blades 19a and 19b swing upwards, their angle of attack is decreased, whereas, downward swinging of the rotor blades has the opposite effect of automatically increasing the angle of attack. Thus, the rotor blades are aerodynamically damped.

Figure 2:
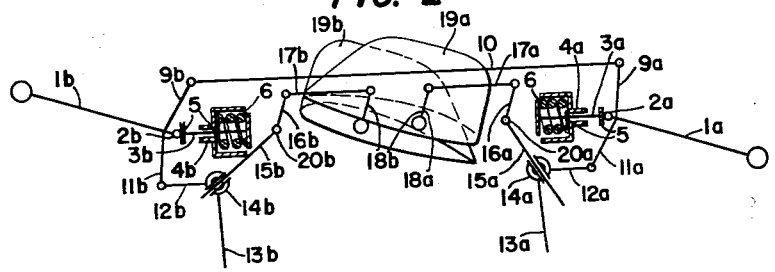
Fig. 2 is a diagrammatic, elevational view of the device of Fig. 1, illustrating the operation of such device in stabilizing normal powered flight.

When the lifting rotor is rotating at normal speed during powered flight, the centrifugal force of the weights on arms 1a and 1b pulls the plungers 3a and 3b radially out until the inner collars 5 abut against the outer walls of the sleeves 4a and 4b so that the radius of rotation of the pivots 2a and 2b and thus also the distance of the pivot members 14a and 14b from the axis of rotation is increased to the utmost. This regulation movement of the pivots 2a and 2b and of the pivot members 14a and 14b lifts the sliding bars 15a and 15b so that the blades 19a and 19b may be adjusted to the largest required angle of attack. If the machine changes its attitude during flight, the gyroscopic moment tends to maintain the weights at the outer ends of arms 1a and 1b in their original plane of rotation. As seen in Fig. 2, the consequent swinging of arms 1a and 1b about pivots 2a and 2b causes the stabilizing device to adjust the rotor blades substantially into the plane of rotation of the weights. The efficiency of the stabilization depends upon the distance of the pivots 2a and 2b of the arms 1a and 1b from the axis of rotation. The highest efficiency would be attained if the pivots 2a and 2b were disposed at the axis of rotation and the weights rotated at a constant angular velocity. This would however cause an insensibility of the helicopter to the cyclic control by the pilot. A certain compromise must therefore be made between the stabilization requirements and the desired maneuverability of the helicopter.

Figure 3:
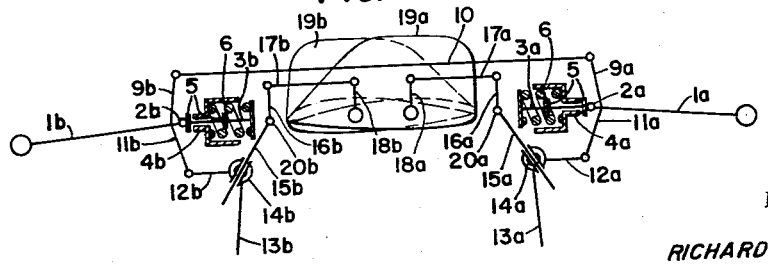
Fig. 3 is a diagrammatic view similar to that of Fig. 2, but illustrating the operation of the device in effecting the automatic changeover to autorotation in the event of engine failure.

Fig. 3 illustrates the operation of the device in automatically adjusting the blades for autorotative flight in the event of engine failure. When rotor speed drops below a predetermined safety limit, the forces exerted by the springs 6 surpass the centrifugal forces of the weights on arms 1a and 1b, so that the plungers 3a and 3b are pulled back towards the axis of rotation. This causes the lever arms 9a and 9b to swing inwardly about the pivots at the opposite ends of rod 10 so that the control system adjusts the rotor blades to a lower pitch, i.e. to the pitch corresponding to autorotative flight. Equal movement of the arms 1a and 1b by the plungers 3a and 3b is ensured by the two arm lever 7 and the tie rods 8a and 8b, so that a correct pitch adjustment of the rotor blades is reliably obtained.

What I claim is:

1. A stabilizing device for a helicopter having a lifting rotor including a rotated rotor head, rotor blades extending radially from the rotor head with each blade being mounted to turn about its longitudinal axis for varying its angle of attack and to swing up and down about a pivot lying in the plane of rotation of the rotor head, and a cyclic and collective pitch control including a control bar for each blade extending substantially parallel to the axis of rotation of the rotor head; said stabilizing device comprising radially extending arms carrying weights at their outer ends, a radially extending sleeve fixed with respect to the rotor head for each weight carrying arm, a plunger slidable in said sleeve and carrying a pivot at its outer end to which the inner end of the related weight carrying arm is connected so that the latter can swing about said pivot in a plane passing through the axis of rotation of the rotor head, means limiting the sliding of each plunger relative to the corresponding sleeve in the radially inward and outward directions, spring means urging each plunger radially inward with respect to the related sleeve so that, during normal powered flight of the helicopter, centrifugal force acting on said weights overcomes said spring means and moves said plungers to their radially outermost positions, whereas, upon engine failure and a consequent decrease in the rotational speed of the rotor, said spring means dominates the opposed centrifugal forces acting on the weights and moves said plungers to their radially innermost positions, control means for regulating the angle of attack of each rotor blade under the influence of the related control bar of the cyclic and collective pitch control, and means operatively connecting each weight carrying arm to said control means for the related rotor blade to effect stabilizing control of the angle of attack of the latter in response to swinging of the weight carrying arm in said plane passing through the axis of rotation while the plungers are in said radially outermost positions, and to automatically decrease the angle of attack of the blade for ensuring autorotation of the rotor when said plungers move to said radially innermost positions in response to an engine failure.

2. A stabilizing device as in claim 1, wherein said radially extending arms comprise two weight carrying arms extending in radially opposed directions, each of said weight carrying arms having a lever arm extending upwardly therefrom adjacent its inner end, and a rigid tie-rod pivotally connected, at its opposite ends, to the upper ends of said upwardly extending lever arms so that, when said plungers are in said outermost positions, said weight carrying arms are constrained to swing in the same angular directions and to the same angular extent.

3. A stabilizing device as in claim 2; further comprising a lever pivotally mounted, at its center, to swing about the axis of rotation of the rotor head, and link members pivotally connected, at their opposite ends, to the ends of said lever and to said plungers, respectively, thereby to ensure the uniform movement of said plungers relative to said sleeves even in the event of a failure of one of said spring means.

4. A stabilizing device as in claim 1; wherein said control means for regulating the angle of attack of each rotor blade includes a lever arm swingably mounted on the rotor head, a pivot member pivotally connected to the upper end of the related control bar of the cyclic and collective pitch control and slidable along said lever arm mounted on the rotor head, and mechanical linkage means connected between said lever arm mounted on the rotor head and the related blade to vary the angle of attack of the latter in response to swinging of said lever arm; and wherein said means operatively connecting each weight carrying arm to the control means for the related rotor blade includes a downwardly extending lever arm fixed to the weight carrying arm adjacent the inner end of the latter, and a connecting member extending substantially in a plane perpendicular to the axis of rotation of the rotor head and pivotally connected, at its opposite ends, to said pivot member and to the lower end of said downwardly extending lever arm.

References Cited in the file of this patent
UNITED STATES PATENTS

| | | |
|---|---|---|
| 1,378,401 | Davies | May 17, 1921 |
| 2,368,698 | Young | Feb. 6, 1945 |
| 2,646,848 | Young | July 28, 1953 |

FOREIGN PATENTS

| | | |
|---|---|---|
| 806,442 | France | Dec. 16, 1936 |